United States Patent
Jiang et al.

(10) Patent No.: US 10,477,452 B1
(45) Date of Patent: Nov. 12, 2019

(54) SPATIAL REUSE IN 60 GHZ WIRELESS NETWORKS

(71) Applicant: Marvell International LTD., Hamilton (BM)

(72) Inventors: Jinjing Jiang, San Jose, CA (US); Liwen Chu, San Ramon, CA (US); Lei Wang, San Diego, CA (US); Yakun Sun, San Jose, CA (US); Hongyuan Zhang, Fremont, CA (US); Hui-Ling Lou, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 142 days.

(21) Appl. No.: 15/446,656

(22) Filed: Mar. 1, 2017

Related U.S. Application Data

(60) Provisional application No. 62/302,644, filed on Mar. 2, 2016.

(51) Int. Cl.
| | |
|---|---|
| *H04W 4/00* | (2018.01) |
| *H04W 40/24* | (2009.01) |
| *H04W 72/04* | (2009.01) |
| *H04W 84/10* | (2009.01) |
| *H04W 84/12* | (2009.01) |

(52) U.S. Cl.
CPC ..... *H04W 40/244* (2013.01); *H04W 72/0453* (2013.01); *H04W 84/10* (2013.01); *H04W 84/12* (2013.01)

(58) Field of Classification Search
CPC ..... H04W 84/12; H04W 48/16; H04W 88/08; H04W 48/18; H04W 48/20
See application file for complete search history.

(56) References Cited

U.S. PATENT DOCUMENTS

| | | | |
|---|---|---|---|
| 2011/0188391 A1* | 8/2011 | Sella ............ | H04W 24/10 370/252 |
| 2014/0004865 A1* | 1/2014 | Bhargava ...... | H04W 74/0816 455/445 |

(Continued)

OTHER PUBLICATIONS

IEEE P802.11ax/D0.1 Draft Standard for Information Technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for high efficiency in frequency bands between 1 GHz and 6 GHz; Mar. 2016; 221 Pages.

(Continued)

*Primary Examiner* — Atique Ahmed

(57) ABSTRACT

The present disclosure proposes systems and methods for performing spatial reuse using the following techniques at access points and stations. More specifically, the present disclosure relates to spatial reuse of medium with a spatial reuse opportunity announcement provided to STAs by an AP, opportunistic directional sensing performed by STAs, and a channel access method with a new backoff procedure performed by the STAs. An AP may provision a spatial reuse opportunity announcement in a beacon interval, and STAs may perform opportunistic directional sensing based on the announcement and perform channel access after performing opportunistic directional sensing.

29 Claims, 8 Drawing Sheets

(56) References Cited

U.S. PATENT DOCUMENTS

| | | | | |
|---|---|---|---|---|
| 2014/0328270 | A1* | 11/2014 | Zhu | H04W 74/002 370/329 |
| 2015/0103767 | A1* | 4/2015 | Kim | H04W 74/06 370/329 |
| 2015/0172996 | A1* | 6/2015 | Park | H04W 74/0875 370/230 |
| 2016/0066198 | A1* | 3/2016 | Wang | H04W 16/28 370/338 |
| 2016/0073429 | A1* | 3/2016 | Oteri | H04W 74/0816 370/338 |
| 2016/0081010 | A1* | 3/2016 | Seok | H04W 74/0816 370/329 |
| 2016/0227565 | A1* | 8/2016 | Ghosh | H04L 5/0091 |
| 2017/0118773 | A1* | 4/2017 | Cariou | H04B 7/0413 |
| 2017/0118774 | A1* | 4/2017 | Cariou | H04W 74/0816 |
| 2017/0164409 | A1* | 6/2017 | Kim | H04W 84/12 |

OTHER PUBLICATIONS

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

IEEE Std. P802.11ad/D5.0 "'Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," The Institute of Electrical and Electronics Engineers, Inc., Sep. 2011.

U.S. Appl. No. 14/961,558, filed Dec. 7, 2015.

U.S. Appl. No. 15/335,160, filed Oct. 26, 2016.

* cited by examiner

SPATIAL REUSE IN 60 GHZ WIRELESS NETWORKS

CROSS-REFERENCE TO RELATED APPLICATIONS

This application claims the benefit of U.S. Provisional Application No. 62/302,644, filed on Mar. 2, 2016. The entire disclosure of the application referenced above is incorporated herein by reference.

FIELD

The present disclosure relates generally to wireless networks and more particularly to spatial reuse of medium in 60 GHz wireless networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Some IEEE 802.11 standards use a carrier sense multiple access with collision avoidance (CSMA/CA) mechanism to access wireless medium (e.g., air, hereinafter medium). A client station (STA) typically listens to the medium (i.e., senses the medium) before transmitting a signal on the medium. There are two methods for sensing the medium. A first method includes physical carrier sensing, which detects presence or absence of RF energy in the medium. A second method includes virtual carrier sensing, which detects presence or absence of an 802.11 signal in the medium.

Clear channel assessment (CCA) is a logical function performed in a physical layer (PHY) of a STA or an access point (AP) that determines a current state of use of the medium. For example, in wireless devices (AP/STA) that use orthogonal frequency division multiplexing (OFDM), a CCA level (threshold) for a 20 MHz channel is typically −82 dB, and the CCA level (threshold) for a 40 MHz channel is typically −79 dB. If an energy level detected in a channel is less than the CCA level for the channel, the channel is considered idle, and a transmission in the channel can be attempted. If the energy level detected in the channel is greater than the CCA level for the channel, the channel is considered busy, the wireless device may backoff, and a transmission may not be attempted to avoid collisions.

SUMMARY

An access point or a Personal Basic Service Set (PBSS) Central Point (AP/PCP comprises a frame generator and a transmitter. The frame generator is configured to generate a beacon frame including an indication indicating whether reuse of wireless medium by wireless devices associated with the AP/PCP is allowed during one or more periods specified in a beacon interval. The transmitter is configured to transmit the beacon frame to the wireless devices.

In other features, the reuse of wireless medium includes spatial reuse of the wireless medium. The wireless devices include client stations. The AP/PCP and the wireless devices operate in a 60 GHz frequency band. The AP/PCP and the wireless devices operate according to Institute of Electrical and Electronics Engineers 802.11ay specification.

In other features, the AP/PCP further comprises a controller configured to generate parameters for the wireless devices to use when performing the reuse of the wireless medium. The frame generator includes the parameters in the beacon frame. The parameters include a transmit power level allowed during the reuse of the wireless medium, a clear channel assessment threshold to determine whether the wireless medium is busy prior to the reuse, and backoff parameters to be used prior to the reuse.

In still other features, a wireless device comprises a receiver and a controller. The receiver is configured to receive a beacon frame from an access point (AP) or a Personal Basic Service Set (PBSS) Central Point (AP/PCP). The beacon frame includes an indication indicating whether reuse of wireless medium by the wireless device associated with the AP/PCP is allowed during a period specified in a beacon interval. The controller is configured to perform the reuse of the wireless medium during the period specified in the beacon interval based on the indication included in the beacon frame.

In other features, the reuse of wireless medium includes spatial reuse of the wireless medium. The wireless device includes a client station. The wireless device and the AP/PCP operate in a 60 GHz frequency band. The wireless device and the AP/PCP operate according to Institute of Electrical and Electronics Engineers 802.11ay specification.

In other features, the beacon frame includes parameters for the wireless device to use when performing the reuse of the wireless medium. The parameters include a transmit power level allowed during the reuse, a clear channel assessment threshold to determine whether the wireless medium is busy prior to reuse, and a backoff parameters prior to reuse.

In other features, the controller comprises a medium access control module configured to identify one or more wireless devices to which the wireless device has data to transmit, and to determine a set of directions in which the one or more wireless devices are located relative to the wireless device.

In other features, the controller further comprises a sensing module configured to sense the wireless medium in directions sequentially selected from the set of directions during a predetermined time period, to determine whether the wireless medium is not busy in one of the directions based on a clear channel assessment threshold for the reuse of the wireless medium or whether one or more conditions for performing the reuse in one of the directions are met, and to stop sensing the wireless medium in response to the wireless medium being busy in the selected directions at the end of the predetermined time period or in response to one or more conditions for performing the reuse in the selected directions are not met at the end of the predetermined time period.

In other features, the controller further comprises a sensing module configured to. sense the wireless medium in a direction selected from the set of directions, to determine whether the wireless medium is busy in the selected direction based on a clear channel assessment threshold for the reuse of the wireless medium or whether one or more conditions for performing the reuse in the selected direction are met, and to attempt to obtain duration information of a scheduled transmit opportunity (TXOP).

In other features, the controller further comprises a backoff module and a transmitter. The backoff module is configured to perform a backoff procedure in response to the wireless medium being not busy in the selected direction or in response to one or more conditions for performing the reuse in the selected direction being met and the reuse to be performed inside the scheduled TXOP. The backoff procedure includes listening to the wireless medium during a backoff period, and sensing the wireless medium in the selected direction again a predetermined amount of time before the backoff period ends. The transmitter is configured to transmit data to one of the wireless devices in the selected direction in response to the wireless medium being not busy in the selected direction when the wireless medium is sensed again.

In other features, the transmitter does not transmit data to the one or more wireless devices in the selected direction in response to the wireless medium being busy in selected direction when the wireless medium is sensed again.

In other features, the controller further comprises a receiver configured to detect whether data is being received during the backoff period. In response to data being received by the receiver during the backoff period, the backoff module aborts the backoff procedure, and the transmitter does not transmit data to the one or more wireless devices in the selected direction.

In other features, the controller further comprises a receiver configured to detect whether data is being received during the backoff period. The transmitter transmits data to the one or more wireless devices in the selected direction in response to data being received by the receiver during the backoff period.

In other features, the controller further comprises a backoff module and a transmitter. The backoff module is configured to perform a backoff procedure in response to the wireless medium being not busy in the selected direction or in response to one or more conditions for performing the reuse in the selected direction being met, and the reuse to be performed beyond the scheduled TXOP or does not know the duration information of the scheduled TXOP. The backoff procedure includes setting a network allocation vector (NAV), and performing a legacy backoff procedure. The transmitter is configured to transmit data to one of the wireless devices in the selected direction in response to the wireless medium being not busy in the selected direction when the wireless medium is sensed again after NAV is zero and the legacy backoff procedure is finished.

In other features, a duration of a transmission from the wireless device during the reuse is less than or equal to a transmit opportunity of the wireless device. The transmit opportunity is a bounded time interval in which the wireless device transfers data of a particular type or traffic class.

In still other features, a method for an access point or a Personal Basic Service Set (PBSS) Central Point (AP/PCP) comprises generating a beacon frame including an indication indicating whether reuse of wireless medium by wireless devices associated with the AP/PCP is allowed during one or more periods specified in a beacon interval, and transmitting the beacon frame to the wireless devices.

In other features, the reuse of wireless medium includes spatial reuse of the wireless medium. The wireless devices include client stations. The AP/PCP and the wireless devices operate in a 60 GHz frequency band. The AP/PCP and the wireless devices operate according to Institute of Electrical and Electronics Engineers 802.11ay specification.

In other features, the method further comprises generating parameters for the wireless devices to use when performing the reuse of the wireless medium, and including the parameters in the beacon frame. The parameters include a transmit power level allowed during the reuse of the wireless medium, a clear channel assessment threshold to determine whether the wireless medium is busy prior to the reuse, and backoff parameters to be used prior to the reuse.

In still other features, a method for a wireless device comprises receiving a beacon frame from an access point (AP) or a Personal Basic Service Set (PBSS) Central Point (AP/PCP). The beacon frame includes an indication indicating whether reuse of wireless medium by the wireless device associated with the AP/PCP is allowed during a period specified in a beacon interval. The method further comprises performing the reuse of the wireless medium during the period specified in the beacon interval based on the indication included in the beacon frame.

In other features, the reuse of wireless medium includes spatial reuse of the wireless medium. The wireless device includes a client station. The wireless device and the AP/PCP operate in a 60 GHz frequency band. The wireless device and the AP/PCP operate according to Institute of Electrical and Electronics Engineers 802.11ay specification.

In other features, the beacon frame includes parameters for the wireless device to use when performing the reuse of the wireless medium. The parameters include a transmit power level allowed during the reuse, a clear channel assessment threshold to determine whether the wireless medium is busy prior to reuse, and a backoff parameters prior to reuse.

In other features, the method further comprises identifying one or more wireless devices to which the wireless device has data to transmit, and determining a set of directions in which the one or more wireless devices are located relative to the wireless device.

In other features, the method further comprises sensing the wireless medium in directions sequentially selected from the set of directions during a predetermined time period, and determining whether the wireless medium is not busy in one of the directions based on a clear channel assessment threshold for the reuse of the wireless medium or whether one or more conditions for performing the reuse in one of the directions are met. The method further comprises stopping sensing the wireless medium in response to the wireless medium being busy in the selected directions at the end of the predetermined time period or in response to one or more conditions for performing the reuse in the selected directions are not met at the end of the predetermined time period.

In other features, the method further comprises sensing the wireless medium in a direction selected from the set of directions, determining whether the wireless medium is busy in the selected direction based on a clear channel assessment threshold for the reuse of the wireless medium or whether one or more conditions for performing the reuse in the selected direction are met, and attempting to obtain duration information of a scheduled transmit opportunity (TXOP).

In other features, the method further comprises performing a backoff procedure in response to the wireless medium being not busy in the selected direction or in response to one or more conditions for performing the reuse in the selected direction being met and the reuse to be performed inside the scheduled TXOP. The backoff procedure includes listening to the wireless medium during a backoff period, and sensing the wireless medium in the selected direction again a predetermined amount of time before the backoff period ends. The method further comprises transmitting data to one of the wireless devices in the selected direction in response to the wireless medium being not busy in the selected direction when the wireless medium is sensed again.

In other features, the method further comprises not transmitting data to the one or more wireless devices in the selected direction in response to the wireless medium being busy in selected direction when the wireless medium is sensed again.

In other features, the method further comprises detecting whether data is being received during the backoff period. In response to data being received by the receiver during the backoff period, the method further comprises aborting the backoff procedure, and not transmitting data to the one or more wireless devices in the selected direction.

In other features, the method further comprises detecting whether data is being received during the backoff period, and transmitting data to the one or more wireless devices in the selected direction in response to data being received by the receiver during the backoff period.

In other features, the method further comprises performing a backoff procedure in response to the wireless medium being not busy in the selected direction or in response to one or more conditions for performing the reuse in the selected direction being met, and the reuse to be performed beyond the scheduled TXOP or does not know the duration information of the scheduled TXOP. The backoff procedure includes setting a network allocation vector (NAV), and performing a legacy backoff procedure. The method further comprises transmitting data to one of the wireless devices in the selected direction in response to the wireless medium being not busy in the selected direction when the wireless medium is sensed again after NAV is zero and the legacy backoff procedure is finished.

In other features, a duration of a transmission from the wireless device during the reuse is less than or equal to a transmit opportunity of the wireless device. The transmit opportunity is a bounded time interval in which the wireless device transfers data of a particular type or traffic class.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
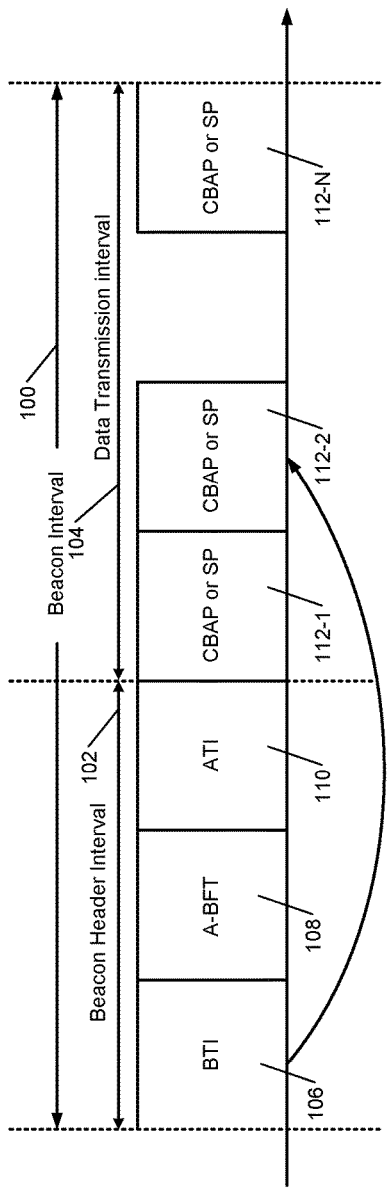
FIG. 1 shows a beacon interval of a beacon transmitted by an access point (AP) in a 60 GHz Wi-Fi transmission according to the present disclosure.

In 60 GHz Wi-Fi networks, beams (i.e., beamformed signals) transmitted by wireless devices are narrower and more focused than beams transmitted in 5 GHz Wi-Fi transmissions. Since the beams are narrow and focused, and therefore highly directional, in the 60 GHz Wi-Fi networks, orthogonal transmissions of the beams can be performed simultaneously. However, these transmissions can cause interference. Further, since the beams are narrow and focused, and therefore highly directional, if a wireless device is sensing the medium in a particular direction, the wireless device is unable to sense other transmissions occurring in other directions.

In most Wi-Fi networks, devices sense the medium before transmission, and if the energy sensed in the medium is greater than a predetermined threshold (e.g., −62 dB or −82 dB), the devices conclude that the medium is busy (e.g., due to another device transmitting data), and do not transmit data. Typically, these thresholds are set conservatively to ensure that the other devices will sense the medium to be busy and will not transmit if another device is transmitting at the same time. However, if two basic service sets (BSS's) are spaced sufficiently apart from each other, the threshold can be relaxed (i.e., increased). With the relaxed thresholds, spatial reuse of the medium can be allowed; that is, two or more simultaneous transmissions can occur in the same band in the same space without causing harmful interference to each other. Such spatial reuse of the medium can improve system performance.

Directional transmission creates more potential spatial reuse opportunities for BSS's, especially for dense deployment, where a plurality of BSS's may be located close together in a cluster while at least some of the BSS's in the cluster may be spaced sufficiently apart from each other to allow spatial reuse. Further, the spatial reuse is not dependent only on the physical distance between the BSS's but may also (i.e., additionally or alternatively) depend on other factors such as modulation and coding schemes (MCS's) used by the BSS's. For example, regardless of the distance, two BSS's may be able to perform spatial reuse at an MCS with a lower data rate than an MCS with a higher data rate.

Since the 60 GHz transmission is highly directional as explained above, the medium may be busy in one direction but not in others in which a station may want to transmit. Therefore, directional sensing (i.e., sensing the medium in a particular direction) and directional clear channel assessment (CCA) detection (i.e., CCA performed by sensing the medium in multiple directions at the same time) can be employed to further improve opportunity for spatial reuse. However, as explained below, directional sensing alone does not provide all the details of channel access. Further, directional CCA involves CCA sensing in multiple directions, which may not be possible or necessary.

The present disclosure proposes systems and methods for performing spatial reuse using the following techniques at access points and stations. More specifically, the present disclosure relates to spatial reuse of medium with a spatial reuse opportunity announcement provided to STAs by an AP, opportunistic directional sensing performed by STAs, and a channel access method with a new backoff procedure performed by the STAs. As explained below in detail, an AP may provision a spatial reuse opportunity announcement in a beacon interval, and STAs may perform opportunistic directional sensing based on the announcement and perform channel access after performing opportunistic directional sensing.

The present disclosure is organized as follows. Initially, the spatial reuse opportunity announcement provided to STAs by an AP, opportunistic directional sensing performed by STAs, and a channel access method with a new backoff procedure performed by the STAs are explained in detail with reference to FIGS. 1-7. Thereafter, examples of systems and methods for implementing spatial reuse opportunity announcement provided to STAs by an AP, opportunistic directional sensing performed by STAs, and a channel access method with a new backoff procedure performed by the STAs are described in detail with reference to FIGS. 8-11.

FIG. 1 shows a beacon interval 100 of a beacon transmitted by an access point (AP) in a 60 GHz Wi-Fi transmission according to the present disclosure. The beacon interval 100 includes a beacon header interval 102 and a data transmission interval 104. The beacon header interval includes a beacon transmission interval (BTI) 106, an association beamforming training time (A-BFT) 108, and an announcement transmission interval (ATI) 110. The data transmission interval 104 includes one or more contention-based access periods (CBAP's) and/or service periods (SP's) 112-1, 112-2, . . . , and 112-N, where N is an integer greater than or equal to 1 (collectively CBAP/SP 112).

Figure 2:
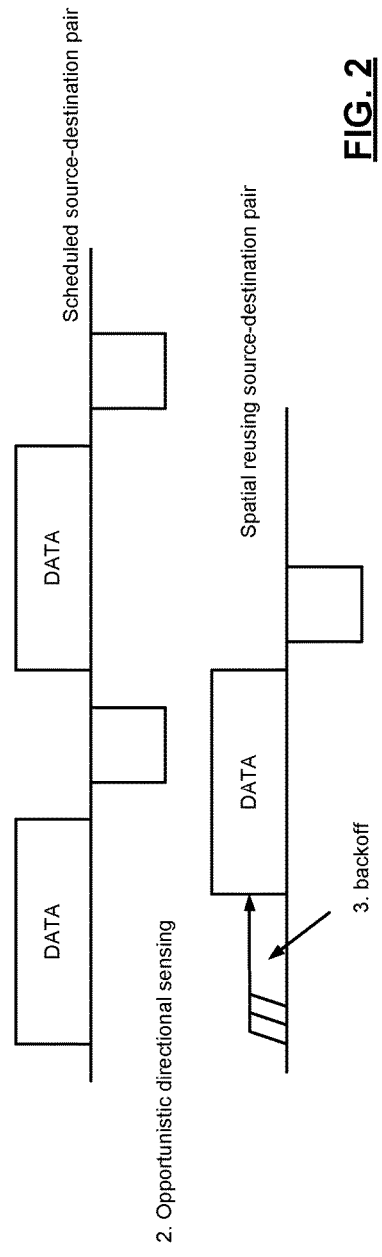
FIG. 2 shows an example of a scheduled data transfer between two client stations (STA's) and an example of a data transfer performed between two STA's by spatial reuse according to the present disclosure.

FIG. 2 shows an example of a scheduled data transfer between STA's. FIG. 2 also shows an example of a data transfer between STA's performed by spatial reuse, which involves opportunistic directional sensing and backoff procedure performed according to the present disclosure as explained below in detail.

While spatial reuse can improve system performance, spatial reuse can also potentially increase unwanted interference in the medium. To minimize interference, the AP can specify whether spatial reuse is allowed in a particular CBAP/SP 112. Specifically, in the beacon header interval 102, for a particular service period SP, which is normally scheduled by the AP, the AP (or a Personal Basic Service Set (PBSS) Central Point (PCP)) can announce whether and when spatial reuse is allowed. For a CBAP, spatial reuse may be always allowed.

More specifically, the AP may include an indication in the BTI 106, where the indication (called an announcement) indicates in which CBAP/SP spatial reuse can occur. In other words, the indication in the BTI 106 identifies a CBAP/SP in which spatial reuse can occur. In addition, along with the announcement in the BTI 106, the AP/PCP may also specify some other parameters for STA's, or conditions that should be met by STA's, for performing spatial reuse. For example, the parameters or conditions may include, but are not limited to, allowed transmission power level, new CCA threshold level, backoff procedure parameters, and so on. Thus, the beacon header interval 102 specifies when spatial reuse can occur (i.e., when the STAs can perform spatial reuse), under what conditions spatial reuse can occur (i.e., the conditions that should be met by the STAs before the STAs can perform spatial reuse), and the parameters for those conditions. This indication could be signaled using a few reserved bits in an Extended Schedule Element or could be included in a newly designed information element (IE).

The AP/PCP selects the CBAP/SP in which to allow spatial reuse and determines the various parameters/conditions for allowing spatial reuse based on a variety of information about the BSS that is available to the AP. For example, the information may include the number of stations in the BSS, the traffic pattern in the BSS, and so on. Any station associated with the AP/PCP can perform spatial reuse during the CBAP/SP identified in the BTI 106 when the specified conditions are met.

An enhanced request to send (RTS)/clear to send (CTS) frame exchange may also be used to fulfill the same signaling or communication between the AP and STAs described above. An extended schedule information element (IE) may also be included in the beacon header interval 102 to carry the above information including the announcement and the parameters/conditions and to perform the above signaling/communication.

Based on the spatial reuse information received in the beacons from the AP, a STA can begin directional sensing when data is pending (buffered in the STA) for transmitting to a particular destination STA. The STA directionally senses the medium only towards the destination STA using an already trained beamforming antenna pattern. If the medium is sensed to be idle or satisfies the spatial reuse condition specified by the AP, the STA begins a channel access procedure for spatial reuse. Otherwise no spatial reuse is allowed by the STA, and the STA may continue directional sensing.

The directional sensing in spatial reuse is now explained. The lower MAC of a STA constructs a list of destination STAs for which buffered MAC Protocol Data Units (MPDUs) exist in enhanced distributed channel access (EDCA) queues (which coordinate channel access) in the STA and to which these buffered MPDUs are to be transmitted from the STA. Suppose that the STA has already performed the beamforming training for each destination STA and therefore knows which direction to transmit when transmitting to each destination STA. The following two types of directions are defined.

First, a virtual direction is defined as <destination STA, beamforming configuration> (i.e., based on the beamforming training, the transmitting STA knows which direction to transmit when transmitting to each destination STA). The STA can maintain a list of virtual directions with limited size. Second, a physical direction (i.e., the actual direction of the antenna) is defined as <antenna configuration> (e.g., quasi-omni direction (covers approximately 120 degrees of a circle for 60 GHz antennas), or one sector sweep direction (narrower than quasi-omni, depends on antenna configuration and capability)). The virtual direction and physical direction can be combined and is called a combined direction. For example, virtual-omni is a type of combined direction that can be sensed using an antenna array that is capable of performing multiple directional sensing at the same time and that can cover almost all the directions (a set of virtual and physical directions that are almost the same as omni direction).

Accordingly, a STA can perform an unrestricted sensing using virtual-omni sensing to find out whether the medium is busy or idle in any single virtual direction. This makes channel access simple since the STA can easily switch from omni listening to directional transmission and vice versa. However, unrestricted sensing requires expensive antennas that may not be feasible in the real world scenarios. Instead, the present disclosure proposes using restricted sensing which can be performed using antennas with limited capabilities. Specifically, using the restricted sensing, a STA can determine whether the medium is busy or idle in one desired virtual direction or a particular physical direction as follows.

Initially, a STA begins listening to the medium in quasi-omni mode (i.e., in about 120 degrees of a circle). The MAC of the STA notifies the PHY of the STA if data is buffered to be sent to other STAs. If data is buffered to be sent to other STAs, the MAC generates a list of available virtual directions in which the medium is free based on the listening. The MAC sorts (i.e., prioritizes) the list of virtual directions based on the type of the data that is to be transmitted (e.g., audio, video, web data etc.) or checks if the sorted list of virtual directions is empty (i.e., no direction is available to transmit). The sorting could be based on enhanced distributed channel access (EDCA) priorities or a MAC scheduling algorithm.

Then the PHY of the STA performs restricted sensing in the virtual direction indicated at the top of the list (i.e., the virtual direction with the highest priority). The PHY may perform the restricted sensing using beamforming training already performed. The restricted sensing may indicate that the medium is idle, or the PHY may determine that the spatial reuse requirements specified by the AP are satisfied. If the medium is idle or if the spatial reuse requirements are satisfied, the PHY invokes channel access with the new backoff procedure (described below) and updates the virtual direction list accordingly after the channel access.

If, however, the restricted sensing indicates that the medium is busy, the STA has multiple options. For example, in a first option, a timeout (i.e., a timer with a predetermined amount of time period derived by the STA from backoff parameters) is set. During the timeout (i.e., while the timer counts down and before the timer expires), the PHY can try sensing additional virtual directions in the sorted list. After the timeout (i.e., after the timer expires), the PHY switches back to the quasi-omni mode for some time so as to not miss any incoming data for the STA, and begins listening to the medium again in quasi-omni mode, and the above procedure is repeated. In a second option, if the restricted sensing indicates that the medium is busy, instead of setting a timeout and trying sensing additional virtual directions in the sorted list, the PHY immediately switches back to the quasi-omni mode for some time so as to not miss any incoming data for the STA, and begins listening to the medium again in quasi-omni mode, and the above procedure is repeated.

Once the PHY of a STA determines that the directional sensing results allow spatial reuse to transmit data from the STA, channel access is performed to transmit data from the STA as follows. When the PHY determines that the medium is available for spatial reuse, it is not prudent for the STA to transmit data immediately for the following reasons. Transmitting data immediately may result in ping-ponging (explained below) between pairs of STAs performing spatial reuse, which may deny one or more STAs a transmit opportunity if no additional transmission duration is added. Transmitting data immediately by multiple pairs of STAs performing spatial reuse may cause collisions if their transmissions are orthogonal to ongoing transmissions between a pair of STAs. Some other STA could transmit data to the STA initiating the spatial reuse, which will cause a receive event at the STA initiating the spatial reuse, and the STA initiating the spatial reuse will miss the data since the STA cannot listen to the medium while performing directional sensing and will therefore not detect the receive event.

Therefore, the present disclosure proposes a new backoff procedure, which is explained below after explaining the ping-ponging.

Figure 3:
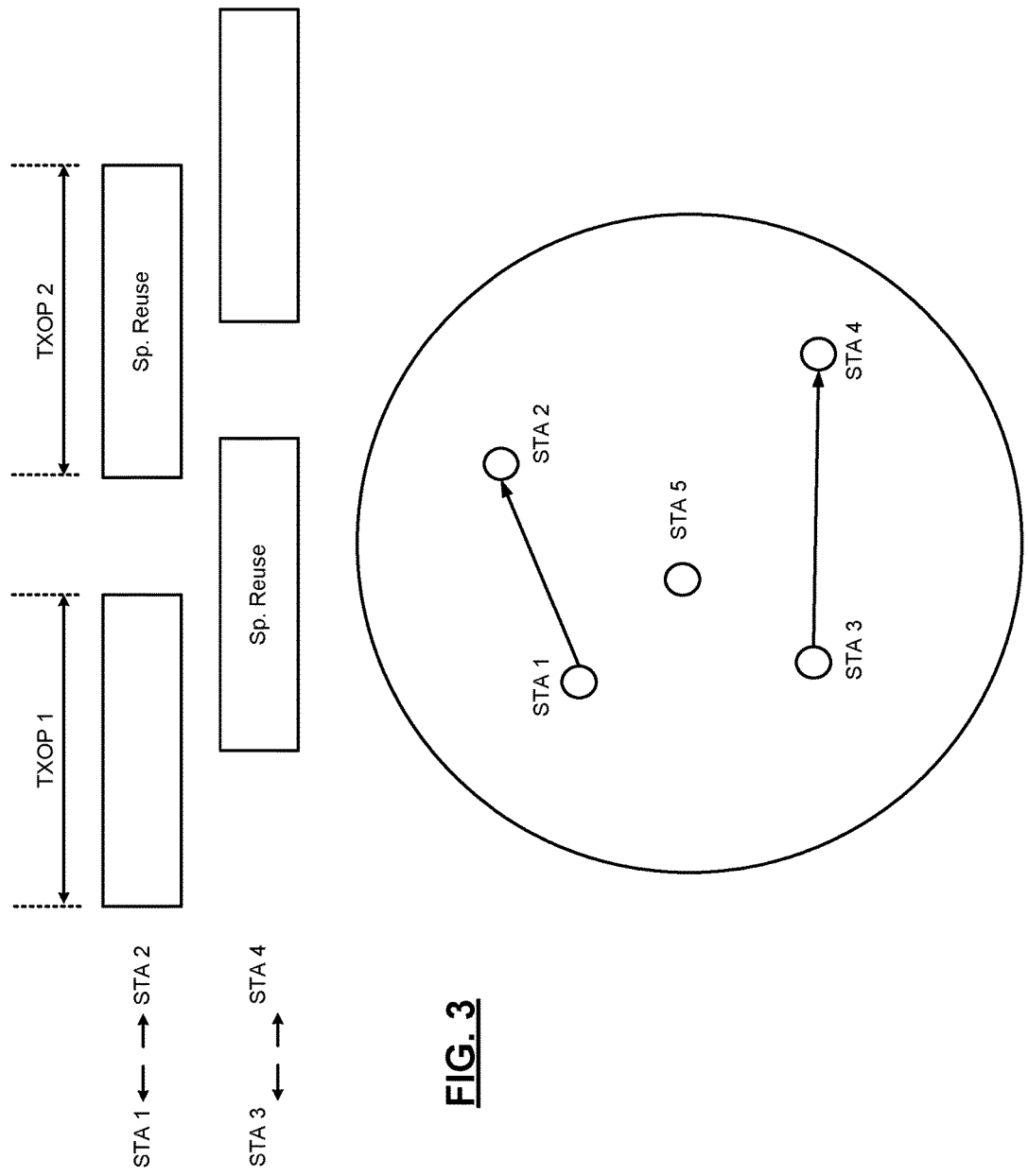
FIG. 3 shows that spatial reuse transmission extending beyond a transmit opportunity (TXOP) duration can deprive other client stations of opportunities to access medium.

FIG. 3 shows the ping-ponging or the ping-pong effect, which is now explained in detail. A Transmit Opportunity (TXOP) is a bounded time period during which a STA may transfer data of a particular type or traffic class. This time duration is typically signaled in a preamble of a Physical Layer Convergence Procedure (PLCP) Protocol Data Unit (PPDU). In the example shown, in TXOP1, there could be multiple sequential Data+Ack frame exchanges between STA1 and STA2. The Ping-Pong effect can occur as follows. Suppose that STA1←→STA2 is the originally scheduled link, and STA3 or STA4 starts the spatial reuse. After STA1 and STA2 finish their initial transmission, if the transmission between STA3 and STA4 continues beyond TXOP1, it is possible that STA1 and STA2 can find out that they can perform spatial reuse with respect to STA3 and STA4; and so on. In this case, STA5 will always see a busy medium and will be starved or deprived of a TXOP. Instead, if spatial reuse is restricted within the TXOP (called per TXOP spatial reuse), after TXOP1 finishes, all STAs need to contend for the medium access. This guarantees fairness for STA5.

Therefore, the present disclosure proposes a new backoff procedure as follows. Specifically, a new contention window for spatial reuse with a backoff period is proposed. The original backoff procedure for CBAP and network allocation vector (NAV) setting remain intact (i.e., as specified in the standard), which simplifies the operation. Before explaining the backoff procedure, the NAV is briefly explained as follows.

MAC frame headers include a duration field that specifies the transmission time required for a frame, in which time the medium will be busy. STAs listening on the medium read the duration field and set their NAV, which is an indicator for a STA on how long the STA is to defer from accessing the medium. The NAV is a counter, which counts down to zero at a uniform rate, and indicates the medium is busy when nonzero and indicates the medium is idle when zero.

Figure 4:
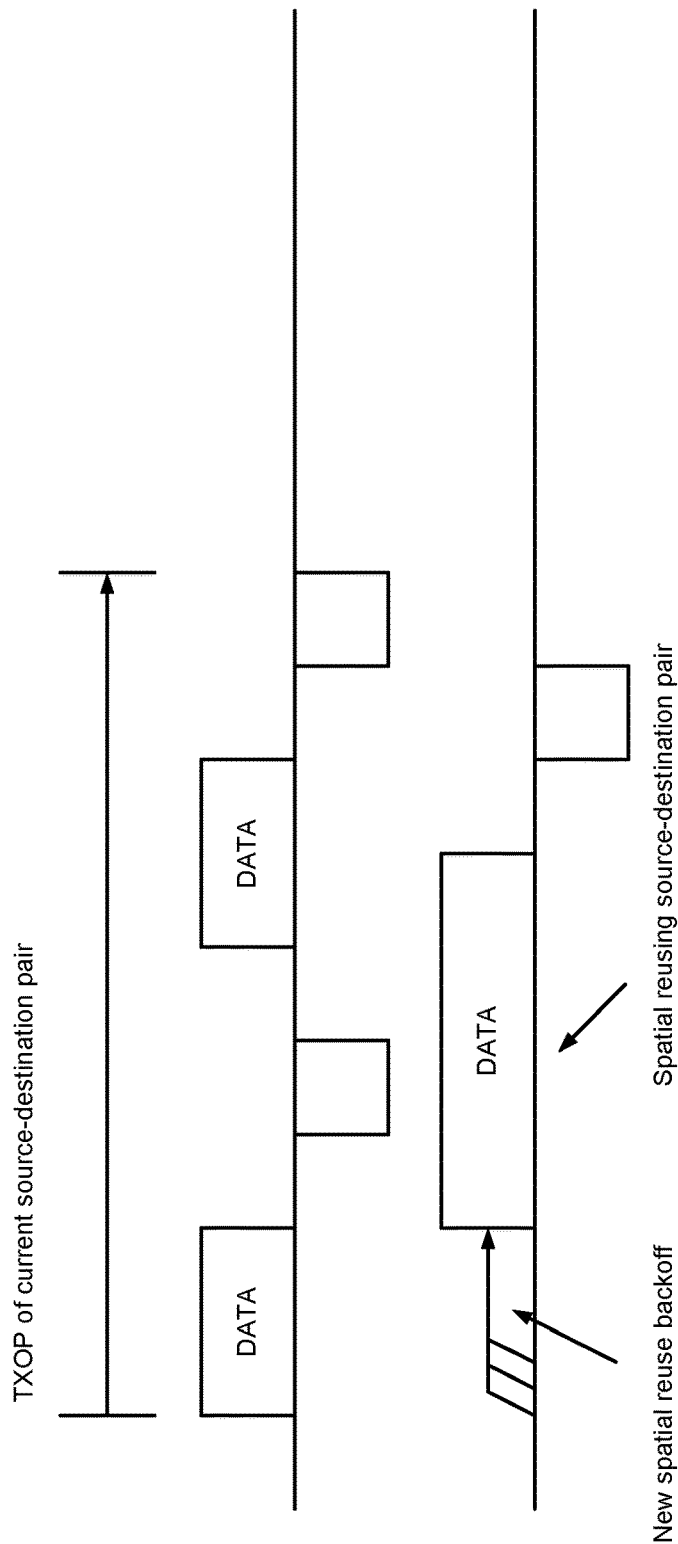
FIG. 4 shows spatial reuse with a new backoff procedure according to the present disclosure.

FIG. 4 shows the spatial reuse with the new backoff procedure. According to the new backoff procedure, after the PHY of the STA determines that the medium is available for spatial reuse, instead of immediately transmitting data, a backoff procedure is performed before transmitting data using the available spatial reuse. That is, after the PHY of the STA determines that the medium is available for spatial reuse, the PHY transmits data by spatial reuse only after performing the backoff procedure first. During the backoff period, which the STA determines based on the backoff parameters, the STA has the following two options.

In a first option, the STA switches back to the quasi-omni listening mode during the backoff period, and switches to directional sensing immediately before the backoff period ends. Specifically, after the PHY of the STA determines that the medium is available for spatial reuse, instead of immediately transmitting data, the STA backs off for a predetermined time period, during which the STA switches back to the quasi-omni listening mode. Immediately before the backoff period is about to end, the STA again performs directional sensing to verify that the direction that was found to be available for spatial reuse is still available for spatial reuse. The STA begins transmitting after the backoff period ends (i.e., at the end of the backoff period) if the direction that was found to be available for spatial reuse before the beginning of the backoff period is still available for spatial reuse near the end of the backoff period. The STA does not transmit if the direction that was found to be available for spatial reuse before the beginning of the backoff period is not available for spatial reuse near the end of the backoff period. The STA also does not transmit if a receive event happens during the backoff period. In a second option, the STA always transmits data using the virtual direction available for spatial reuse at the end of the backoff period and ignores possible receive events that may occur due to transmissions to the STA from other STAs.

Figure 5:
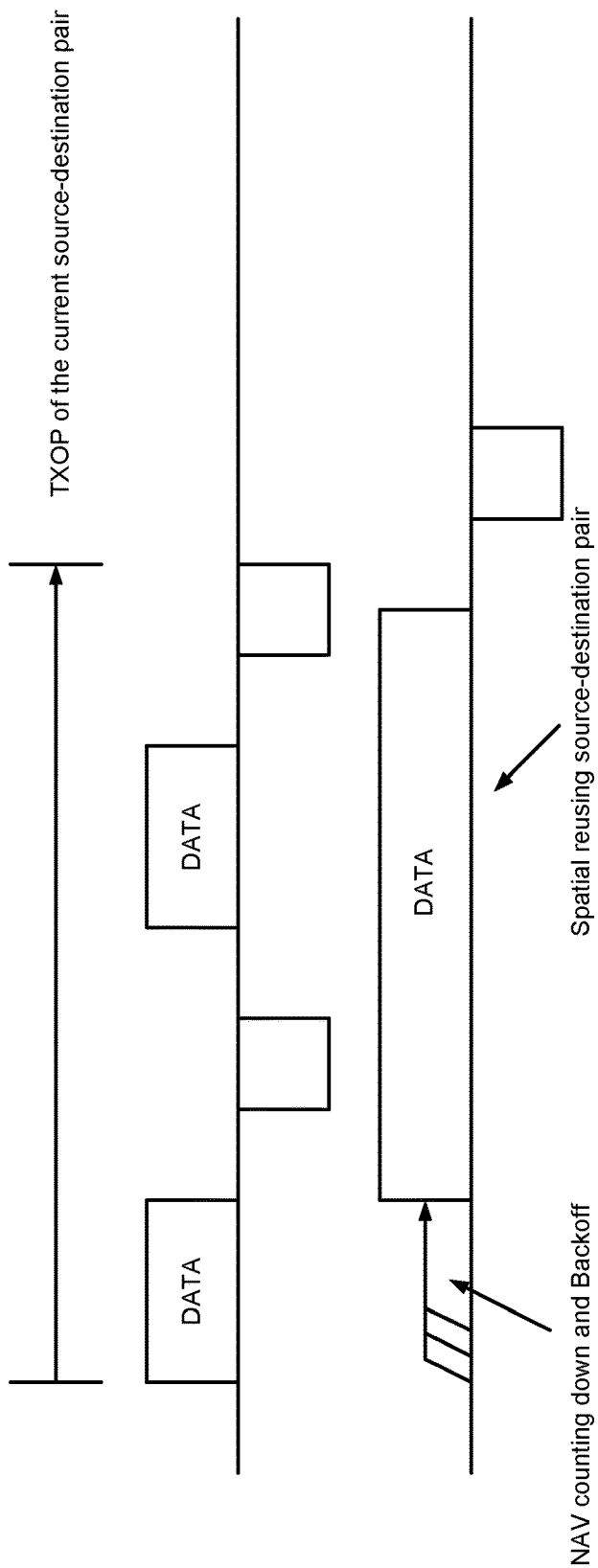
FIG. 5 shows spatial reuse transmission extending beyond a scheduled TXOP duration.

FIG. 5 shows spatial reuse transmission extending beyond the scheduled TXOP duration. As mentioned above, to avoid ping-ponging, the duration of the spatial reuse transmission should be less than the scheduled TXOP duration. However, in some implementations, the spatial reuse transmission may be allowed to extend beyond the scheduled TXOP duration or does not have the duration information about the scheduled TXOP. Specifically, after the PHY of the STA determines based on the directional sensing that the medium is available for spatial reuse, instead of using the new backoff procedure, the STA may regard the medium as idle and start counting down the NAV and then backoff based on the directional CCA. The STA may then transmit in the direction available for spatial reuse and may extend the transmission beyond the scheduled TXOP duration of the STA.

Figure 6:
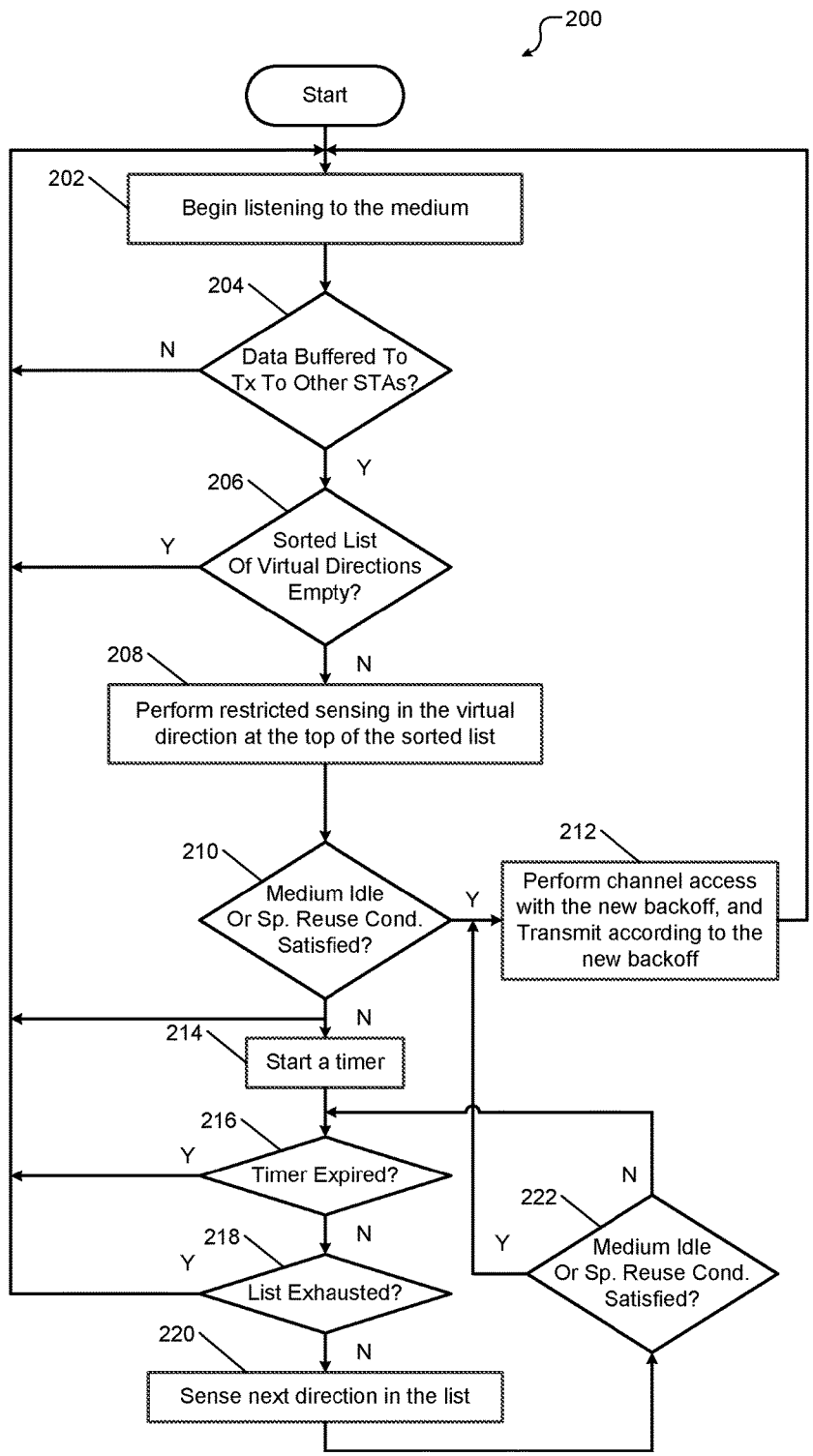
FIG. 6 is a flowchart of a method for performing directional sensing when performing spatial reuse according to the present disclosure.

FIG. 6 shows a method 200 for performing directional sensing at a client station (e.g., see client station(s) 414 shown and described below with reference to FIGS. 8-11) when performing spatial reuse according to the present disclosure. At 202, control (e.g., see one or more elements of client station(s) 414 shown and described below with reference to FIGS. 8-11) begins listening to the medium. At 204, control determines whether data is buffered for transmission to other stations. Control returns to 202 if data is not buffered for transmission to other stations. At 206, if data is buffered for transmission to other stations, control determines whether a sorted list of virtual directions in which to transmit data to the other stations is empty (i.e., whether no virtual directions are available to transmit data to the other stations). Control returns to 202 if the sorted list of virtual directions in which to transmit data to the other stations is empty (i.e., if no virtual directions are available to transmit data to the other stations).

At 208, if the sorted list of virtual directions in which to transmit data to the other stations is not empty (i.e., if one or more virtual directions are available to transmit data to a stations), control performs a restricted sensing in a virtual direction at the top of the sorted list (i.e., a first direction). At 210, control determines based on the restricted sensing performed in the first direction if the medium is idle or if one or more spatial reuse conditions specified by the access point are satisfied at the client station. At 212, if control determines based on the restricted sensing performed in the first direction that the medium is idle or if one or more spatial reuse conditions specified by the access point are satisfied at the client station, control performs channel access using the new backoff procedure according to the present disclosure (explained above and with reference to FIG. 7 below) and transmits data in the first direction to a client station.

At 214, if control determines based on the restricted sensing performed in the first direction that the medium is busy or if one or more spatial reuse conditions specified by the access point are not satisfied at the client station, control starts a timer. At 216, control checks whether the timer has expired. Control returns to 202 if the timer has expired. At 218, if the timer has not expired, control determines whether the sorted list is exhausted. Control returns to 202 if the sorted list is exhausted. At 220, if the sorted list is not exhausted, control selects a next direction in the sorted list (i.e., a second direction) and performs restricted sensing in the second direction.

At 222, control determines based on the restricted sensing performed in the second direction if the medium is idle or if one or more spatial reuse conditions specified by the access point are satisfied at the client station. Control returns to 216 if control determines based on the restricted sensing performed in the second direction that the medium is busy or if one or more spatial reuse conditions specified by the access point are not satisfied at the client station. Control returns to 212 if control determines based on the restricted sensing performed in the second direction that the medium is idle or if one or more spatial reuse conditions specified by the access point are satisfied at the client station.

Figure 7:
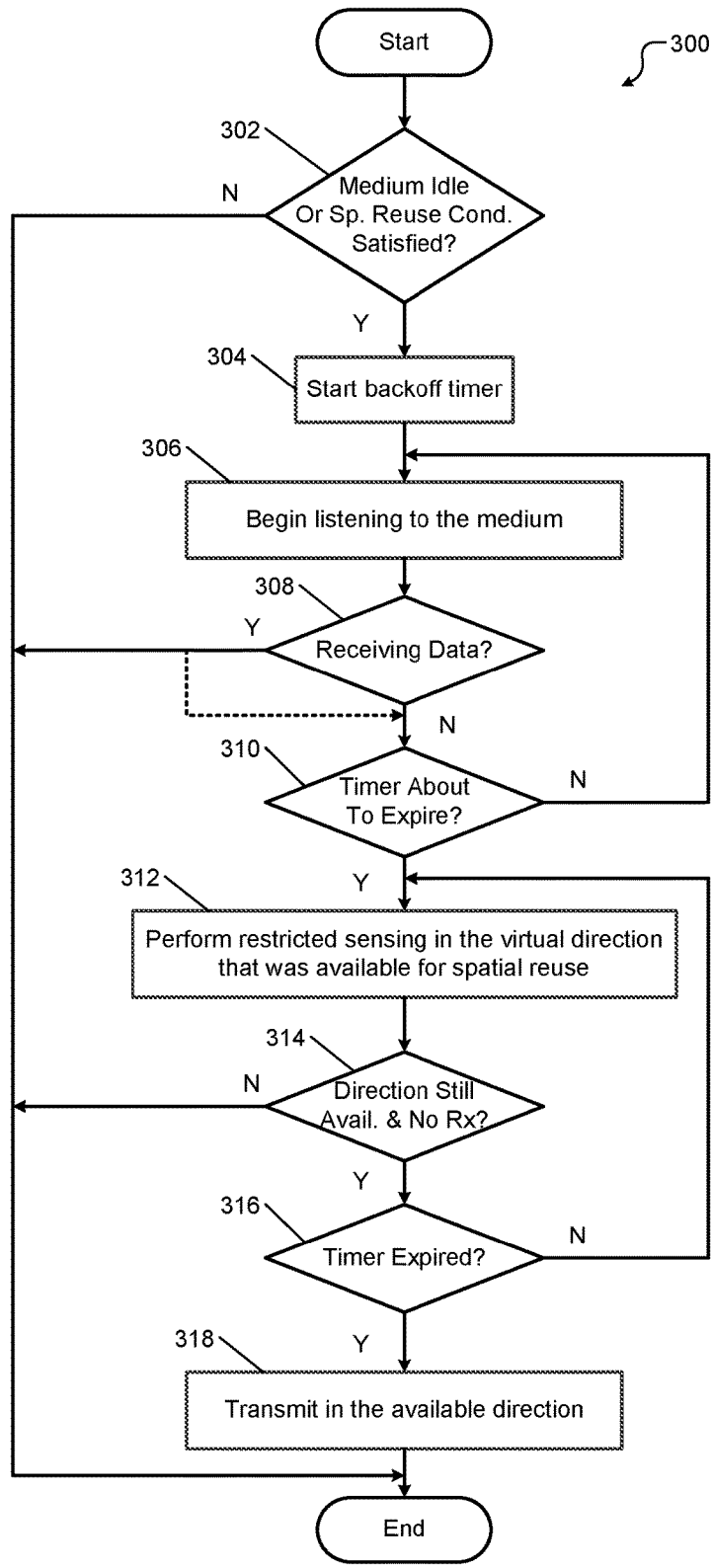
FIG. 7 is a flowchart of a method for performing backoff when performing spatial reuse according to the present disclosure.

FIG. 7 shows a method 300 for performing backoff at a client station (e.g., see client station(s) 414 shown and described below with reference to FIGS. 8-11) when performing spatial reuse according to the present disclosure. At 302, control (e.g., see one or more elements of client station(s) 414 shown and described below with reference to FIGS. 8-11) determines based on the restricted sensing performed in a selected direction (as explained above) if the medium is idle or if one or more spatial reuse conditions specified by the access point are satisfied at the client station. Control ends if control determines based on the restricted sensing performed in the selected direction that the medium is busy or if one or more spatial reuse conditions specified by the access point are not satisfied at the client station. At 304, if control determines based on the restricted sensing performed in the selected direction that the medium is idle or if one or more spatial reuse conditions specified by the access point are satisfied at the client station, control starts a backoff timer, a value for which is set by the STA based on the backoff parameters. At 306, control begins listening to the medium.

At 308, control checks whether the station is receiving data at the station. In some implementations, control ends if the station is receiving data. At 310, if the station is not receiving data (or in some implementations, even if the station is receiving data), control determines whether the backoff timer is about to expire (i.e., whether the backoff timer is approaching expiration or whether a short predetermined time period exists before the backoff timer expires).

At 312, if the backoff timer is about to expire (i.e., if the backoff timer is approaching expiration or if a short predetermined time period exists before the backoff timer expires), control performs restricted sensing (as described above) in the selected virtual direction that was available for spatial reuse at 302. At 314, control determines, based on the restricted sensing performed again in the selected virtual direction at 312, whether the selected virtual direction is still available for spatial reuse and no data is being received at the station. Control ends if control determines that, based on the restricted sensing performed again in the selected virtual direction at 312, the selected virtual direction is not available for spatial reuse and/or data is being received at the station.

At 316, if control determines that, based on the restricted sensing performed again in the selected virtual direction at 312, the selected virtual direction is still available for spatial reuse and no data is being received at the station at 314, control determines whether the backoff timer has expired. Control returns to 312 if the backoff timer has not expired. At 318, if the backoff timer has expired, control transmits data to a client station in the available direction (i.e., the selected direction at 302, which is determined to be still available at 314).

Figure 8:
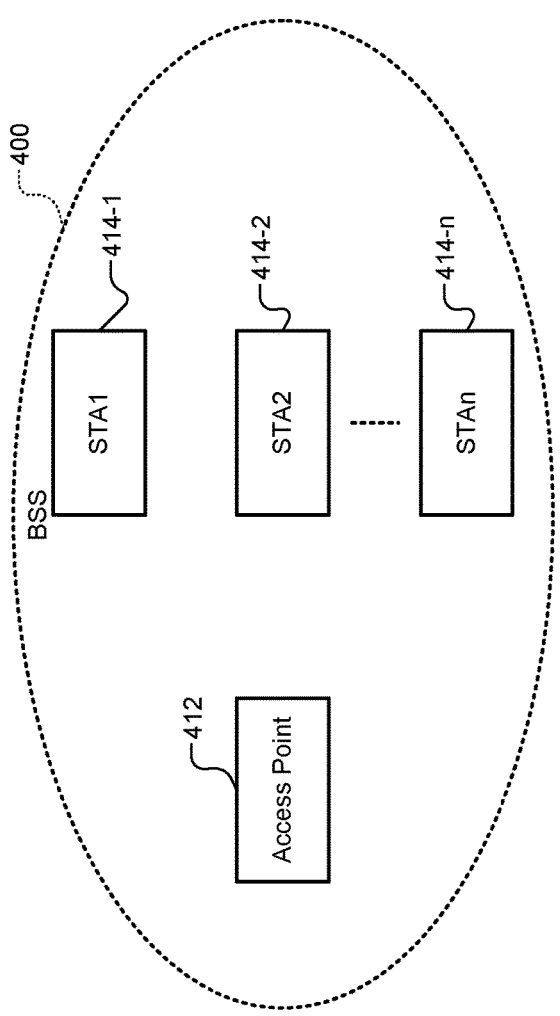
FIG. 8 shows a basic service set comprising an access point and client stations.

FIG. 8 shows a basic service set (BSS) 400. The BSS 400 includes an access point (AP) 412 and a plurality of client stations STA1 414-1, STA2 414-2, . . . , and STAn 414-n, where n is an integer greater than one (collectively STAs 414). The BSS 400 is compliant with Institute of Electrical and Electronics Engineers (IEEE) 802.11ay specification and operates in a 60 GHz frequency band. The AP 412 and the STAs 414 performs the functions and operations related to spatial reuse described above including those described with reference to FIGS. 1-7 and with reference to FIGS. 9-11 below. In some implementations, the BSS 400 may be a Personal Basic Service Set (PBSS), and the AP 412 may be a PBSS Central Point (PCP).

Figure 9:
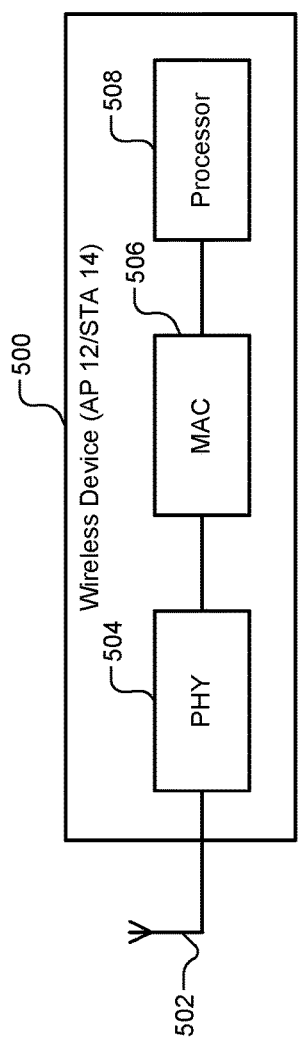
FIG. 9 shows a functional block diagram of an access point and a client station of the basic service set of FIG. 8.

FIG. 9 shows a wireless device 500 (e.g., the AP 412 or the STA 414 of the BSS 400). The wireless device 500 includes an antenna 502, a physical layer (PHY) 504, a medium access controller (MAC) 506, and a processor 508. While a single antenna 502 is shown, the wireless device 500 may include a plurality of antennas. For example, the plurality of antennas may be arranged in a multiple-input multiple-output (MIMO) configuration. The antennas of the wireless device 500 may be already trained using beamforming using relevant beamforming procedures. The PHY 504 interfaces the wireless device 500 with the medium via the antenna 502. The MAC 506 controls access by the wireless device 500 to the medium. The processor 508 processes packets that are received and that are to be transmitted by the wireless device 500 via the antenna 502. The elements 502, 504, and 506 are similar to the corresponding elements 502-1, 504-1, and 506-1 shown in FIG. 10 and elements 502-2, 504-2, and 506-2 shown in FIG. 11.

Figure 10:
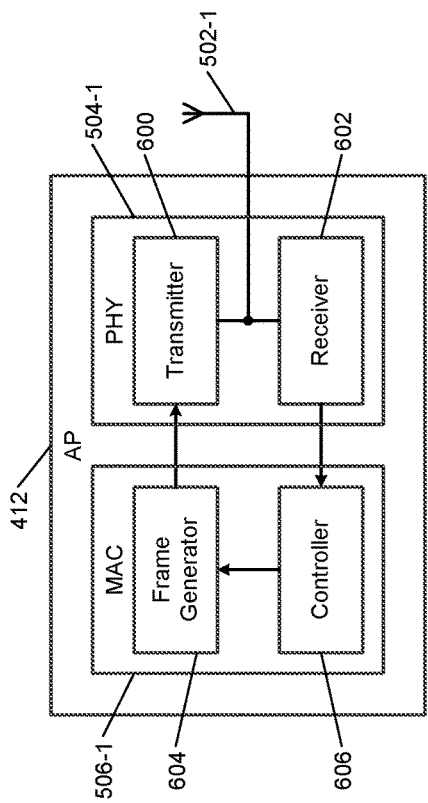
FIG. 10 shows a functional block diagram of an access point including a spatial reuse system according to the present disclosure.

FIG. 10 shows a functional block diagram of the access point (AP) 412 that includes the spatial reuse systems and methods according to the present disclosure described above and below. The AP 412 includes the antenna 502-1, the PHY 504-1, and the MAC 506-1, which are similar to the corresponding elements 502, 504, and 506 of the wireless device 500 shown in FIG. 9. Further, the PHY 504-1 of the AP 412 includes a transmitter 600 and a receiver 602, and the MAC 506-1 of the AP 412 includes a frame generator 604 and a controller 606. The AP 412 operates in a 60 GHz frequency band and complies with the IEEE 802.11ay specification.

The frame generator 604 generates a beacon frame (see FIG. 1), which is transmitted periodically. Each period is called a beacon interval (element 100 shown in FIG. 1). The beacon interval includes a first portion and a second portion. The first portion of the beacon interval is a beacon header interval (e.g., element 102 shown in FIG. 1), where the beacon frame is transmitted during beacon transmission interval (element 106 shown in FIG. 1). The second portion of the beacon interval is a data transmission interval (e.g., element 104 shown in FIG. 1). The beacon frame includes an indication (e.g., in an Extended Schedule Element) indicating whether spatial reuse of the wireless medium by the client stations 414 associated with the AP 412 is allowed during one or more periods specified in the second portion of the beacon interval (e.g., elements 112 shown in FIG. 1). Alternatively, the frame generator 604 may include the indication in a new information element in the beacon frame. The one or more periods specified in the second portion of the Beacon Interval may include one or more scheduled service periods (e.g., elements SP 112 shown in FIG. 1). The one or more periods specified in the second portion of the Beacon Interval may include one or more contention based access periods (e.g., elements CBAP 112 shown in FIG. 1). The transmitter 600 transmits the beacon frame to the client stations 414 in the BSS 400.

The controller 606 generates parameters for the client stations 414 to use when performing spatial reuse. The parameters include a transmit power level allowed during spatial reuse, a clear channel assessment (CCA) threshold to determine whether the wireless medium is busy prior to spatial reuse, and a duration to backoff prior to spatial reuse. The controller 606 generates parameters based on information regarding the BSS 400 (e.g., number of STAs 414 in the BSS 400, traffic patterns in the BSS 400, etc.) received from the receiver 602. The frame generator 604 includes the parameters in the first portion of the beacon interval (e.g., with the indication included in the first portion of the beacon interval) that is transmitted to the STAs 414.

Figure 11:
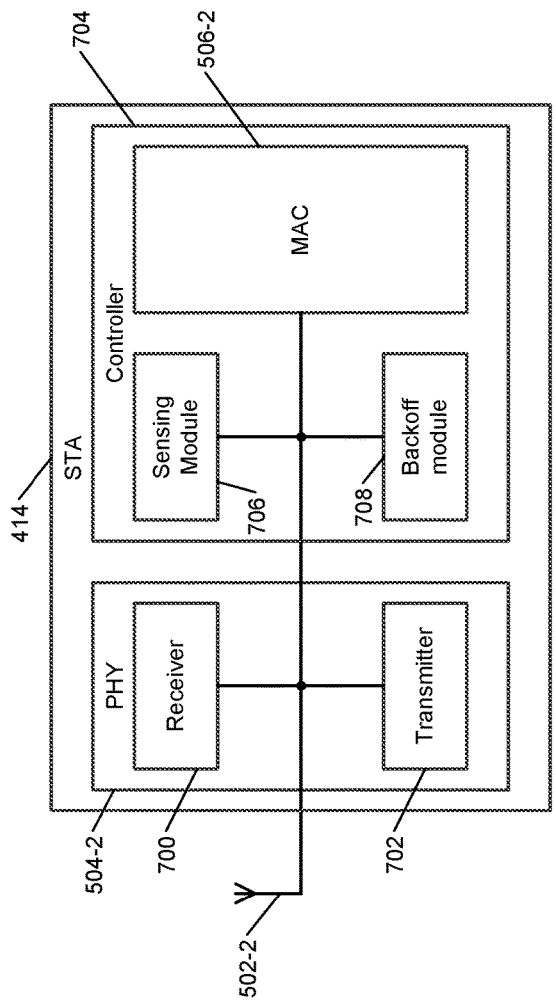
FIG. 11 shows a functional block diagram of a client station including a spatial reuse system according to the present disclosure.

FIG. 11 shows a functional block diagram of the client station (STA) 414 that includes the spatial reuse systems and methods according to the present disclosure described above. The STA 414 includes an antenna 502-2, a PHY 504-2, and a MAC 506-2, which are similar to the corresponding elements 502, 504, and 506 of the wireless device 500 shown in FIG. 9. Further, the PHY 504-2 of the STA 414 includes a receiver 700 and a transmitter 702, and the STA 414 includes a controller 606 that includes the MAC 506-2, a sensing module 706, and a backoff module 708. The STA 414 operates in a 60 GHz frequency band and complies with the IEEE 802.11ay specification.

The receiver 700 receives a beacon frame (see FIG. 1) from the access point 412 during the Beacon Interval. The Beacon Interval includes a first portion and a second portion. The first and second portions of the Beacon Interval are respectively a beacon header interval (e.g., element 102 shown in FIG. 1) and a data transmission interval (e.g., element 104 shown in FIG. 1). The beacon frame was transmitted in the first portion of the Beacon Interval, and the beacon frame includes an indication indicating whether spatial reuse of wireless medium by the client station 414 that is associated with the access point 412 is allowed during a period specified in the second portion of the beacon frame. The period specified in the second portion of the Beacon Interval includes a scheduled service period (e.g., element SP 112 shown in FIG. 1) or a contention based access period (e.g., element CBAP 112 shown in FIG. 1). The controller 704 performs the spatial reuse during the period (e.g., element SP/CBAP 112 shown in FIG. 1) specified in the second portion of the Beacon Interval based on the indication included in the first portion of the Beacon Interval.

The beacon frame additionally includes parameters provided by the AP 412 for the client station 414 to use when performing spatial reuse. For example, the parameters may include, but are not limited to, a transmit power level allowed to be used by the transmitter 702 during spatial reuse, a clear channel assessment (CCA) threshold to be used by the receiver 700 or the sensing module 706 to determine whether the wireless medium is busy prior to spatial reuse, and a duration to backoff to be used by the backoff module 708 prior to spatial reuse.

As described above in detail, the controller 704 or the MAC 506-2 performs the restricted sensing as follows. The controller 704 or the MAC 506-2 identifies (e.g., detects or determines) one or more client stations in the BSS 400 to which the client station 414 has data to transmit. The controller 704 or the MAC 506-2 determines a set (or a sorted list) of directions in which the one or more client stations are located in the BSS 400 relative to the client station 414. The controller or the sensing module 706 senses the wireless medium in the directions sequentially selected one direction at a time from the set (e.g., the sorted list) of directions during a predetermined time period (e.g., the timer shown at 214 in FIG. 6). The controller 704 or the MAC 506-2 determines whether the wireless medium is not busy (i.e., is idle) in one of the selected directions based on a clear channel assessment (CCA) threshold for spatial reuse of the wireless medium or whether one or more conditions for performing spatial reuse in one of the selected directions are satisfied (met). The controller 704 or the MAC 506-2 stops sensing the wireless medium when the wireless medium is busy in the selected directions at the end of the predetermined time period (i.e., when the timer expires) or when one or more conditions for performing spatial reuse in the selected directions are not satisfied (met) at the end of the predetermined time period (i.e., when the timer expires).

In other words, during the predetermined time period (i.e., the duration of the timer), the controller 704 or the sensing module 706 senses the wireless medium in a direction selected from the set of directions, one direction at a time from top to bottom of the sorted (i.e., prioritized list). The controller 704 or the sensing module 706 determines whether the wireless medium is busy in the selected direction based on a CCA threshold for spatial reuse of the wireless medium or whether one or more conditions for performing spatial reuse in the selected direction are met.

As described above in detail, the controller 704 or the backoff module 708 performs the backoff procedure when the wireless medium is not busy (i.e., is idle) in the selected direction or when one or more conditions for performing spatial reuse in the selected direction are met. As described above, the backoff procedure includes listening to the wireless medium during a backoff period and sensing the wireless medium in the selected direction again a predetermined amount of time before the backoff period ends (i.e., expires). The transmitter 702 transmits data to one of the client stations in the BSS 400 in the selected direction in response to the wireless medium being not busy (i.e., being idle) in the selected direction when the wireless medium is sensed again. The transmitter 702 does not transmit data to the one or more client stations in the selected direction in response to the wireless medium being busy in selected direction when the wireless medium is sensed again.

The controller 704 or the receiver 700 detects whether data is being received during the backoff period. If data being received by the receiver 700 during the backoff period, the backoff module 708 aborts the backoff procedure, and the transmitter 702 does not transmit data to the one or more client stations in the BSS 400 in the selected direction. In some implementations, the transmitter 702 may transmit data to the one or more client stations in the BSS 400 in the selected direction if data being received by the receiver 700 during the backoff period.

To avoid ping-ponging and to increase fairness (i.e., medium access opportunities for other client stations) in the BSS 400 while the client station 414 performs spatial reuse, the controller 704 sets the duration of transmission from the client station 414 during the spatial reuse to less than or equal to a transmit opportunity (TXOP) duration of the client station 414. The transmit opportunity (TXOP) of a client station is a bounded time interval in which the client station that supports quality of service (QoS) transfers data of a particular type or traffic class. In some implementations, the controller 704 may allow the duration of transmission from the client station 414 during the spatial reuse to be greater than the transmit opportunity (TXOP) duration of the client station 414.

The wireless communications described in the present disclosure can be conducted in full or partial compliance with IEEE standard 802.11-2016, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2016 may be supplemented by draft IEEE standard 802.11ah-2016 and/or draft IEEE standard 802.11ai-2016.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An access point (AP) or a Personal Basic Service Set (PBSS) Central Point (AP/PCP) operating in a 60 GHz frequency band, the AP/PCP comprising:
   a frame generator to generate a beacon frame including an indication indicating whether spatial reuse of wireless medium by wireless devices associated with the AP/PCP is allowed during a plurality of periods following the beacon frame,
   the plurality of periods being specified in a beacon interval of the beacon frame, wherein the plurality of periods include one or more scheduled service periods and one or more contention based access periods; and
   a transmitter to transmit the beacon frame to the wireless devices;
   wherein the AP/PCP and the wireless devices operate according to Institute of Electrical and Electronics Engineers 802.11ay specification.

2. The AP/PCP of claim 1, wherein the wireless devices include client stations.

3. The AP/PCP of claim 1, further comprising:
   a controller to generate parameters for the wireless devices to use when performing the reuse of the wireless medium,
   wherein the frame generator includes the parameters in the beacon frame.

4. The AP/PCP of claim 3, wherein the parameters include:
   a transmit power level allowed during the reuse of the wireless medium,
   a clear channel assessment threshold to determine whether the wireless medium is busy prior to the reuse, and
   backoff parameters to be used prior to the reuse.

5. A wireless device comprising:
a receiver to:
  receive a beacon frame from an access point (AP) or a Personal Basic Service Set (PBSS) Central Point (AP/PCP),
    wherein the beacon frame includes an indication indicating whether reuse of wireless medium by the wireless device associated with the AP/PCP is allowed during a period specified in a beacon interval of the beacon frame, and
    wherein the period specified in the beacon interval of the beacon frame occurs after the beacon frame; and
a controller to perform the reuse of the wireless medium during the period specified in the beacon interval based on the indication included in the beacon frame;
wherein the controller comprises a medium access control circuit to:
  identify one or more wireless devices to which the wireless device has data to transmit; and
  determine a set of directions in which the one or more wireless devices are located relative to the wireless device; and
wherein the controller further comprises a sensing circuit to:
  sense the wireless medium in a direction selected from the set of directions prioritized based on type of data to be transmitted, wherein the sensing is performed using beamforming training already performed;
  determine whether the wireless medium is busy in the selected direction based on a clear channel assessment threshold for the reuse of the wireless medium or whether one or more conditions for performing the reuse in the selected direction are met; and
  attempt to obtain duration information of a scheduled transmit opportunity (TXOP).

6. The wireless device of claim 5, wherein the reuse of wireless medium includes spatial reuse of the wireless medium.

7. The wireless device of claim 5, wherein the wireless device includes a client station.

8. The wireless device of claim 5, wherein:
the beacon frame includes parameters for the wireless device to use when performing the reuse of the wireless medium; and
the parameters include a transmit power level allowed during the reuse, a clear channel assessment threshold to determine whether the wireless medium is busy prior to reuse, and a backoff parameters prior to reuse.

9. The wireless device of claim 5, wherein the sensing circuit is configured to:
sense the wireless medium in directions sequentially selected from the set of directions during a predetermined time period;
determine whether the wireless medium is not busy in one of the directions based on a clear channel assessment threshold for the reuse of the wireless medium or whether one or more conditions for performing the reuse in one of the directions are met; and
stop sensing the wireless medium in response to the wireless medium being busy in the selected directions at the end of the predetermined time period or in response to one or more conditions for performing the reuse in the selected directions are not met at the end of the predetermined time period.

10. The wireless device of claim 5, wherein the controller further comprises:

a backoff circuit to perform a backoff procedure in response to the wireless medium being not busy in the selected direction or in response to one or more conditions for performing the reuse in the selected direction being met and the reuse to be performed inside the scheduled TXOP, wherein the backoff procedure includes:
  listening to the wireless medium during a backoff period; and
  sensing the wireless medium in the selected direction again a predetermined amount of time before the backoff period ends; and
a transmitter to transmit data to one of the wireless devices in the selected direction in response to the wireless medium being not busy in the selected direction when the wireless medium is sensed again.

11. The wireless device of claim 10, wherein the transmitter does not transmit data to the one or more wireless devices in the selected direction in response to the wireless medium being busy in selected direction when the wireless medium is sensed again.

12. The wireless device of claim 10, wherein the controller further comprises:
a detector to detect whether data is being received during the backoff period,
  wherein in response to data being received by the receiver during the backoff period:
    the backoff circuit aborts the backoff procedure, and
    the transmitter does not transmit data to the one or more wireless devices in the selected direction.

13. The wireless device of claim 10, wherein the controller further comprises:
a detector to detect whether data is being received during the backoff period,
  wherein the transmitter transmits data to the one or more wireless devices in the selected direction in response to data being received by the receiver during the backoff period.

14. The wireless device of claim 5, wherein the controller further comprises:
a backoff circuit to perform a backoff procedure in response to the wireless medium being not busy in the selected direction or in response to one or more conditions for performing the reuse in the selected direction being met, and the reuse to be performed beyond the scheduled TXOP or does not know the duration information of the scheduled TXOP, wherein the backoff procedure includes:
setting a network allocation vector (NAV); and
performing a legacy backoff procedure; and
a transmitter to transmit data to one of the wireless devices in the selected direction in response to the wireless medium being not busy in the selected direction when the wireless medium is sensed again after NAV is zero and the legacy backoff procedure is finished.

15. The wireless device of claim 5, wherein a duration of a transmission from the wireless device during the reuse is less than or equal to a transmit opportunity of the wireless device, and wherein the transmit opportunity is a bounded time interval in which the wireless device transfers data of a particular type or traffic class.

16. The wireless device of claim 5, wherein:
the wireless device and the AP/PCP operate in a 60 GHz frequency band; and the wireless device and the AP/PCP operate according to Institute of Electrical and Electronics Engineers 802.11ay specification.

17. A method for an access point (AP) or a Personal Basic Service Set (PBSS) Central Point (AP/PCP) operating in a 60 GHz frequency band, the method comprising:
generating a beacon frame, wherein the beacon frame includes an indication indicating whether spatial reuse of wireless medium by wireless devices associated with the AP/PCP is allowed during a plurality of periods specified in a beacon interval of the beacon frame, and wherein the plurality of periods specified in the beacon interval of the beacon frame occur after the beacon frame, wherein the plurality of periods include one or more scheduled service periods and one or more contention based access periods; and
transmitting the beacon frame to the wireless devices;
wherein the AP/PCP and the wireless devices operate according to Institute of Electrical and Electronics Engineers 802.11ay specification.

18. The method of claim 17, wherein the wireless devices include client stations.

19. The method of claim 17, further comprising:
generating parameters for the wireless devices to use when performing the reuse of the wireless medium; and
including the parameters in the beacon frame,
wherein the parameters include:
a transmit power level allowed during the reuse of the wireless medium,
a clear channel assessment threshold to determine whether the wireless medium is busy prior to the reuse, and
backoff parameters to be used prior to the reuse.

20. A method for a wireless device, the method comprising:
receiving a beacon frame from an access point (AP) or a Personal Basic Service Set (PBSS) Central Point (AP/PCP), wherein the beacon frame includes an indication indicating whether reuse of wireless medium by the wireless device associated with the AP/PCP is allowed during a period specified in a beacon interval of the beacon frame, and wherein the period specified in the beacon interval of the beacon frame occurs after the beacon frame;
performing the reuse of the wireless medium during the period specified in the beacon interval based on the indication included in the beacon frame;
identifying one or more wireless devices to which the wireless device has data to transmit; and
determining a set of directions in which the one or more wireless devices are located relative to the wireless device;
sensing the wireless medium in a direction selected from the set of directions prioritized based on type of data to be transmitted, wherein the sensing is performed using beamforming training already performed;
determining whether the wireless medium is busy in the selected direction based on a clear channel assessment threshold for the reuse of the wireless medium or whether one or more conditions for performing the reuse in the selected direction are met; and
attempting to obtain duration information of a scheduled transmit opportunity (TXOP).

21. The method of claim 20, wherein:
the reuse of wireless medium includes spatial reuse of the wireless medium;
the wireless device includes a client station;
the wireless device and the AP/PCP operate in a 60 GHz frequency band; and
the wireless device and the AP/PCP operate according to Institute of Electrical and Electronics Engineers 802.11ay specification.

22. The method of claim 20, wherein:
the beacon frame includes parameters for the wireless device to use when performing the reuse of the wireless medium; and
the parameters include a transmit power level allowed during the reuse, a clear channel assessment threshold to determine whether the wireless medium is busy prior to reuse, and a backoff parameters prior to reuse.

23. The method of claim 20, further comprising:
sensing the wireless medium in directions sequentially selected from the set of directions during a predetermined time period;
determining whether the wireless medium is not busy in one of the directions based on a clear channel assessment threshold for the reuse of the wireless medium or whether one or more conditions for performing the reuse in one of the directions are met; and
stopping sensing the wireless medium in response to the wireless medium being busy in the selected directions at the end of the predetermined time period or in response to one or more conditions for performing the reuse in the selected directions are not met at the end of the predetermined time period.

24. The method of claim 20, further comprising:
performing a backoff procedure in response to the wireless medium being not busy in the selected direction or in response to one or more conditions for performing the reuse in the selected direction being met and the reuse to be performed inside the scheduled TXOP, wherein the backoff procedure includes:
listening to the wireless medium during a backoff period; and
sensing the wireless medium in the selected direction again a predetermined amount of time before the backoff period ends; and
transmitting data to one of the wireless devices in the selected direction in response to the wireless medium being not busy in the selected direction when the wireless medium is sensed again.

25. The method of claim 24, further comprising not transmitting data to the one or more wireless devices in the selected direction in response to the wireless medium being busy in selected direction when the wireless medium is sensed again.

26. The method of claim 24, further comprising:
detecting whether data is being received during the backoff period,
wherein in response to data being received by the wireless device during the backoff period, the method further comprises:
aborting the backoff procedure, and
not transmitting data to the one or more wireless devices in the selected direction.

27. The method of claim 24, further comprising:
detecting whether data is being received during the backoff period; and
transmitting data to the one or more wireless devices in the selected direction in response to data being received by the wireless device during the backoff period.

28. The method of claim 20 further comprising:
performing a backoff procedure in response to the wireless medium being not busy in the selected direction or in response to one or more conditions for performing the reuse in the selected direction being met, and the reuse to be performed beyond the scheduled TXOP or does not know the duration information of the scheduled TXOP, wherein the backoff procedure includes:

setting a network allocation vector (NAV);

and performing a legacy backoff procedure; and transmitting data to one of the wireless devices in the selected direction in response to the wireless medium being not busy in the selected direction when the wireless medium is sensed again after NAV is zero and the legacy backoff procedure is finished.

29. The method of claim 20, wherein a duration of a transmission from the wireless device during the reuse is less than or equal to a transmit opportunity of the wireless device, and wherein the transmit opportunity is a bounded time interval in which the wireless device transfers data of a particular type or traffic class.

* * * * *